United States Patent [19]

Mörz

[11] Patent Number: 4,630,059

[45] Date of Patent: Dec. 16, 1986

[54] FOUR-PORT NETWORK COUPLING ARRANGEMENT FOR MICROWAVE ANTENNAS EMPLOYING MONOPULSE TRACKING

[75] Inventor: Günter Mörz, Ludwigsburg, Fed. Rep. of Germany

[73] Assignee: ANT Nachrichtentechnik GmbH, Backnang, Fed. Rep. of Germany

[21] Appl. No.: 620,491

[22] Filed: Jun. 14, 1984

[30] Foreign Application Priority Data

Jun. 18, 1983 [EP] European Pat. Off. ........ 83105973.8

[51] Int. Cl.[4] ...................... H01Q 21/06; H01Q 21/24; H04B 7/10

[52] U.S. Cl. .................................. 343/362; 343/786; 333/135; 333/21 A; 333/21 R

[58] Field of Search ............... 333/135, 137, 136, 134, 333/132, 129, 126, 208, 210, 21 R, 21 A; 343/786, 756, 772, 781 R, 16 M, 361, 427, 362–365

[56] References Cited

U.S. PATENT DOCUMENTS

| | | | |
|---|---|---|---|
| 2,207,845 | 7/1940 | Wolff | 333/34 |
| 2,709,240 | 5/1955 | Gibson | 333/21 R X |
| 3,573,838 | 4/1971 | Ajioka | 343/786 X |
| 3,665,481 | 5/1972 | Low et al. | 343/762 |
| 3,758,880 | 9/1973 | Mörz | 333/126 |
| 3,815,136 | 6/1974 | Rootsey | 343/786 X |
| 3,864,683 | 2/1975 | Mörz | 343/786 X |
| 3,978,434 | 8/1976 | Mörz et al. | 333/135 |
| 4,241,353 | 12/1980 | Solvat et al. | 343/786 |
| 4,268,804 | 5/1981 | Spinner et al. | 333/125 |
| 4,344,048 | 8/1982 | Mörz | 333/135 |

FOREIGN PATENT DOCUMENTS

| | | | |
|---|---|---|---|
| 0041077 | 12/1981 | European Pat. Off. . | |
| 750823 | 1/1945 | Fed. Rep. of Germany . | |
| 2135611 | 2/1975 | Fed. Rep. of Germany . | |
| 2521956 | 11/1976 | Fed. Rep. of Germany . | |
| 2443166 | 2/1977 | Fed. Rep. of Germany . | |
| 2460552 | 1/1978 | Fed. Rep. of Germany . | |
| 2703878 | 8/1978 | Fed. Rep. of Germany . | |
| 2737125 | 2/1979 | Fed. Rep. of Germany . | |
| 2804132 | 8/1979 | Fed. Rep. of Germany . | |
| 2608092 | 8/1979 | Fed. Rep. of Germany . | |
| 1942678 | 12/1979 | Fed. Rep. of Germany | 343/786 |
| 2212996 | 9/1980 | Fed. Rep. of Germany . | |
| 2932626 | 2/1981 | Fed. Rep. of Germany . | |
| 2096860 | 3/1972 | France . | |

*Primary Examiner*—Eugene R. LaRoche
*Assistant Examiner*—Benny Lee
*Attorney, Agent, or Firm*—Spencer & Frank

[57] ABSTRACT

A four-port network which is connected to a microwave antenna feed horn for separating four signal paths associated, in pairs, with two polarizations and two frequency bands, and with the network also being utilized for the derivation of antenna tracking signals according to the monopulse principle. A conductor is disposed along the longitudinal axis of the waveguide connecting the antenna feed horn with the four-port network, with this conductor extending, on the one hand, to the region of the antenna feed horn throat and, on the other hand, into the four-port network so as to couple in signals of a higher order mode for the derivation of the antenna deviation signals.

8 Claims, 3 Drawing Figures

FOUR-PORT NETWORK COUPLING ARRANGEMENT FOR MICROWAVE ANTENNAS EMPLOYING MONOPULSE TRACKING

BACKGROUND OF THE INVENTION

The present invention relates to a four-port network for the separation of four signal paths associated with two polarizations in each of two frequency bands, whose input waveguide, in which the signals of both frequency bands and both polarizations are able to propagate, is connected with the feed horn of a microwave antenna, and which is provided with a circuit branching arrangement for separating the frequencies and polarizations. More particularly the present invention relates to an improved arrangement for coupling the four-port network to the microwave antenna feed horn in a system wherein the antenna is provided with a monopulse tracking system for the antenna.

Microwave antennas are frequently utilized to transmit and receive signals from two frequency bands and two polarizations. Feeder systems permitting such multiple utilization of the antenna are known by the name of four-port network, system filter or quadruplexer. The state of the art includes four-port networks designed for two linearly orthogonally polarized frequency bands (see, for example, Federal Republic of Germany DE-AS No. 2,443,166 and corresponding U.S. Pat. No. 3,978,434), and those designed for two circularly orthogonally polarized frequency bands (see, for example, DE-OS No. 2,932,626 and corresponding U.S. Pat. No. 4,344,048, and DE-OS No. 2,703,878 and corresponding U.S. Pat. No. 4,319,206).

Such four-port networks are used, for example, in ground station antenna for satellite radio operating in the 4/6 GHz range. Particularly in connection with satellite radio, methods and apparatus are required which permit tracking of the ground station antenna with the associated satellite. Customarily this is done with the aid of the known monopulse method according to which antenna deviation signals are derived from the radiation characteristics of one or a plurality of higher order waveguide modes. Such monopulse methods are described in great detail in, for example, German Pat. No. 2,135,611 and corresponding U.S. Pat. No. 3,758,880 and in German Pat. No. 2,212,996 and corresponding U.S. Pat. No. 3,864,683.

In satellite radio, the frequency band (4 GHz) of the downward or received signal generally lies far below the frequency band (6 GHz) of the upward or transmitted signal. The monopulse device of the ground station antenna needs the downward signal (received signal) to derive the deviation signals. This generally involves the problem that the higher order wave modes required to otain the deviation signal are able to exist only in the throat of the antenna feed horn. The reason for this is that the higher order wave modes are reflected in the tapering throat of the antenna feed horn which permits only the fundamental mode to pass. Coupling in the higher order modes can therefore take place only within the conical horn throat. Devices for coupling the higher order modes into a waveguide and particularly into a conical antenna feed horn are known as mode couplers, e.g. see German Pat. No. 2,135,611 and corresponding U.S. Pat. No. 3,758,880, German Pat. No. 2,212,996 and corresponding U.S. Pat. No. 3,864,683, DE-AS No. 2,460,552 and corresponding U.S. Pat. No. 3,964,070, and German Pat. No. 2,608,092 and corresponding U.S. Pat. No. 4,048,592. These publications show that the mode couplers are rather costly structures. Moreover, there exists the danger that the coupling in of the higher order modes by means of a prior art mode coupler directly at the antenna feed horn (see DE-AS No. 2,460,552 and corresponding U.S. Pat. No. 3,964,070) will excite undesirable modes, as well as causing useful signal components to be coupled out.

SUMMARY OF THE INVENTION

It is now the object of the present invention to supplement an antenna feeder system employing a four-port network of the above-mentioned type by simple means which accomplish the derivation of at least one higher order mode required for monopulse tracking without interfering with the communication signal transmission properties of the four-port network.

The above is generally accomplished by the present invention in that a longitudinally arranged conductor is disposed along the longitudinal axis of the waveguide connecting the antenna feed horn and the four-port network, with this conductor extending from the region of the throat of the antenna feed horn, where it couples in at least the signals of one higher order mode which are able to propagate there to the vicinity of the branching arrangement in the input waveguide of the four-port network so that the higher order mode signals traveling along the conductor are coupled, together with the communication signal of one frequency band, to the arms of the branching arrangement and the higher order mode signals are separated from the communication signals by means of hybrids which connect the branching arms associated with one polarization.

The present invention will now be described in greater detail with the aid of an embodiment which is illustrated in the drawing figures.

DETAILED DESCRIPTION OF THE PREFERRED EMBODIMENT

Figure 1:
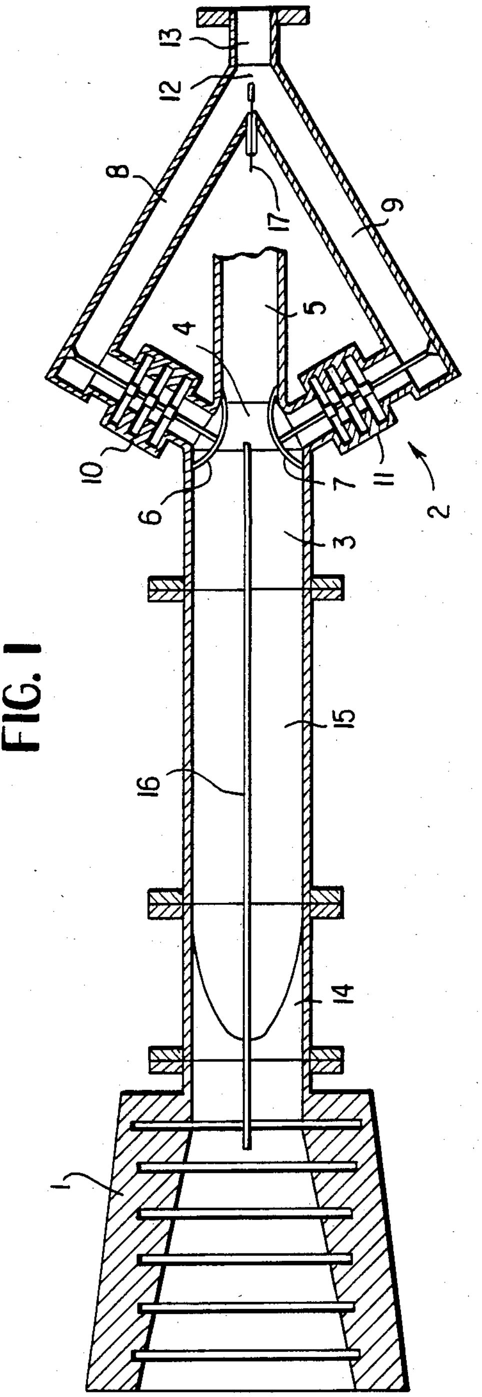
FIG. 1 is a longitudinal sectional view of a four-port network, or system filter, connected to a grooved or corrugated antenna feedhorn via a coupling arrangement according to the invention.

Referring now to FIG. 1, there is shown a longitudinal sectional view of a grooved antenna feed horn 1 which is connected to a four-port network 2. The four-port network is disclosed in detail in, for example, Federal Republic of Germany DE-AS No. 2,443,166 and corresponding U.S. Pat. No. 3,978,434, issued Aug. 31, 1976. In general, this four-port network 2 begins with an input waveguide 3 having a circular or square cross section wherein two doubly polarized waveguide modes can propagate in two frequency bands, e.g., 4 GHz and 6 GHz. The input waveguide 3 is followed by a waveguide section 4 having a tapering cross section which forms the transition to a waveguide 5 in which, due to its cross-sectional dimensions, the waves of the lower frequency band (4 GHz) are unable to propagate. Waveguide 5 is followed by a polarization filter (not shown in this figure) which divides the waves of the upper frequency band (6 GHz) into its two orthogonal polarizations.

The high pass characteristics of waveguide 5 produce standing waves in the lower frequency band at the end of input waveguide 3 and in the front portion of transition waveguide section 4 where the two frequency bands are to be branched apart. These standing waves are coupled in by means of four symmetrically arranged coupling elements. FIG. 1 shows only those coupling elements 6, 7 which lie in a longitudinal plane. The other two coupling elements are arranged in the longitudinal sectional plane perpendicular to the plane of the drawing.

Each one of the two coupling elements 6 and 7 is connected to a respective waveguide arm 8, 9 each having integrated therein a respective filter 10,11 which, for example, are in the form of coaxial bandfilters. These filters 10,11 serve to block upper frequency band signal components which have been coupled in by coupling elements 6, 7 together with the signals of the lower frequency band. In a similar manner, the other two coupling elements (not shown) are each similarly connected to a respective waveguide arm including a respective filter which functions in the same manner as the filters 10 and 11.

Every pair of oppositely disposed waveguide arms, e.g. the arms 8 and 9, is brought together in a 180° hybrid (magic T), e.g. the hybrid 12 connecting the arms 8 and 9. The communication signal of the lower frequency band of the one polarization direction is then present at the sum output 13 of the hybrid 12 while the communication signal of the lower frequency band of the other polarization direction is then present at the sum output of the second hybrid (not shown).

The above-described four-port network 2 which is based, as indicated above, on DE-AS No. 2,443,166 and U.S. Pat. No. 3,978,434, is designed to separate linearly polarized signals from two different frequency bands. By simply supplementing the four-port network, in the manner disclosed in DE-OS No. 2,932,626, corresponding to U.S. Pat. No. 4,344,048, with one polarization converter placed upstream of the input waveguide section 3 and a second polarization converter between waveguide 5 and the polarization filter (not shown) for the upper frequency band, the four-port network is also able to separate circularly polarized signals.

For monopulse tracking of the antenna, it is customary to utilize the higher order $E_{01}$ mode which is excited in an antenna feed horn having a circular cross section or the higher order $E_{11}$ mode which is excited in an antenna feed horn having a rectangular cross section.

FIG. 1 shows the means with which the higher order $E_{01}$ mode or $E_{11}$ mode, which customarily are unable to propagate through the throat of the antenna feed horn 1 and then through the subsequent input waveguide (which in the illustrated embodiment includes waveguide sections 14 and 15 in addition to section 3) due to its cross-sectional dimensions, is coupled to the four-port network 2. The coupling is effected by means of a conductor 16 which is disposed along the longitudinal axis of the input waveguide 14, 15, 3, and passes centrally through waveguide sections 14, 15, 3 between antenna feed horn 1 and the branches for the frequency bands in four-port network 2. Waveguide section 14 here represents a transition from a circular waveguide cross section, for example of the feedhorn 1, to a square waveguide cross section e.g. of the waveguide section 3, (or vice versa), and waveguide section 15 is, for example, a polarization converter as known from DE-OS No. 2,932,626 and corresponding U.S. Pat. No. 4,344,048.

Conductor 16 extends into antenna feed horn 1 (which in the illustrated embodiment has a circular cross section) so that it completely couples in the higher order mode which is present if there is an antenna deviation (i.e., the $E_{01}$ mode in a grooved antenna feed horn with a circular cross section) and converts this higher order mode into a coaxial mode (TEM mode). In the vicinity of coupling means 6, 7 where the frequency bands are branched through the four-port network, conductor 16 ends and generates an aperiodic $E_{11}$ field which is coupled, together with the communication signal of the lower frequency band, to the waveguide arms 8, 9 following behind the coupling means 6 and 7. The higher order mode is finally separated from the communication signal mode in the 180° hybrid 12 which brings together waveguide arms 8, 9. In this way, the communication signal can be obtained at the sum output 13 and the signals of the higher order mode at the difference output 17 of hybrid 12.

Thus it is possible, with the use of simple means, to guide the higher order mode required for monopulse tracking from the antenna feed horn 1 to output port 17 of the four-port network while avoiding the critical wavelength characteristics of the throat of the antenna feed horn 1 and the subsequent waveguide sections 14, 15, 3.

As already mentioned above, the four-port network 2 is equipped with a total of two hybrids, each of which brings together two waveguide arms. At its difference output, each hybrid thus furnishes a signal component of the higher order mode. Both higher order mode signal components can be combined, for example, in that the difference outputs of the two hybrids are connected together by means of a 3dB coupler and a preconnected phase shifting member. Also, one of the two difference outputs may be provided with a displaceable short-circuit so that impedence matching of the other difference output with the higher order mode can be optimized at a desired frequency.

It is a very advantageous feature of the present invention for the higher order mode to pass through filters 10, 11 disposed behind respective coupling means 6, 7 in that it keeps the higher order mode free of signal components of the higher frequency band.

Figure 2:
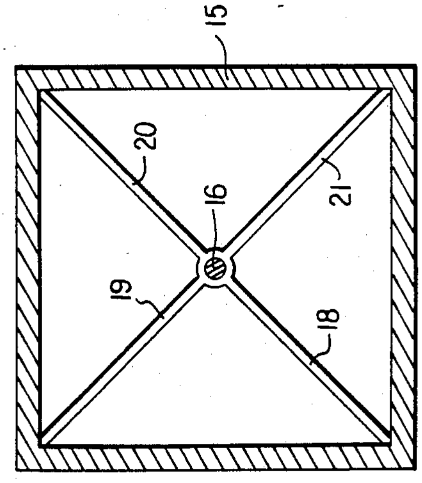
FIG. 2 shows a cross sectional view of a waveguide in which a conductor is fastened by dielectric filaments.

Fastening of conductor 16 in the center of waveguide sections 14, 15 and 3 can be effected by means of dielectric supports, e.g. diagonally stretched threads or filaments. To keep interference with the communication signal mode negligibly low, care must be taken that the supports contain only little dielectric material. FIG. 2 depicts a cross sectional view of the waveguide 15 equipped with the above mentioned dielectric support. This support has four dielectric arms 18, 19, 20 and 21 which end in the four corners of the waveguide 15 and surround the conductor 16 in the center of the waveguide.

Figure 3:
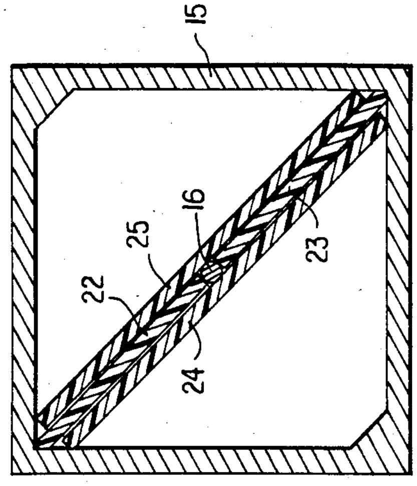
FIG. 3 shows a cross sectional view of a polarization converter in which a conductor is supported.

If waveguide section 15 is designed as a polarization converter as disclosed in DE-OS No. 2,932,626 and U.S. Pat. No. 4,344,048, the conductor 16 may be fastened to the diagonally extending dielectric plate. FIG. 3 shows a cross sectional view of the waveguide section 15 designed as a polarization converter. The diagonally extending dielectric plate is divided into two plate sections 22 and 23 between which the conductor 16 is placed. These two plate sections 22 and 23 and the conductor 16 are embedded by two additional dielectric plates 24 and 25.

It will be understood that the above description of the present invention is susceptible to various modifications, changes and adaptations, and the same are intended to be comprehended within the meaning and range of equivalents of the appended claims.

What is claimed is:

1. A four-port network and coupling arrangement for a microwave antenna associated with four communication signal paths corresponding respectively to two polarizations in each of two different frequency bands, and providing a higher order mode signal useable for monopulse tracking of the antenna, said network and coupling arrangment comprising in combination:

a microwave antenna feed horn;

a four-port network means for separating said signal paths, said network means including an input waveguide in which the signals of both frequency bands and both polarizations are able to propagate and which has one end connected to said antenna feed horn and its other end connected to a further waveguide section having a branching arrangement for separating the frequency bands, said branching arrangement including two orthogonally arranged pairs of oppositely disposed coupling elements with each element leading to one end of a respective waveguide arm and with each pair being associated with a respective one of the two polarizations of one of said frequency bands, and first and second hybrid means, each connected to the other ends of the two said arms for a respective pair of said elements, for each providing the communication signal for a respective one polarization direction of said one frequency band at a respective output; and means for coupling at least one higher order mode signal, which mode is able to exist in the throat of said antenna feed horn but is not able to propagate through said input waveguide due to its dimensions, to said arms of said branching arrangement, said means including a conductor disposed along the longitudinal axis of said input waveguide and extending from the region of said throat of said feed horn to the vicinity of said coupling elements, whereby signals of said higher order mode are conducted along said conductor, are coupled together with the communication signals of said one frequency band to said arms of said branching arrangement, are separated from said communication signals of said one frequency band in the respective said hybrid means and appear at a second output of the respective said hybrid means.

2. The apparatus defined in claim 1 wherein each said hybrid means is a 180° hybrid and said communication signals appear at the sum output of the respective said 180° hybrid and said signals of said higher modes appear at the difference output of the respective said 180° hybrid.

3. The apparatus defined in claim 1 wherein said one frequency band is the lower of said two frequency bands.

4. The apparatus defined in claim 1 wherein said conductor is mounted along said longitudinal axis of said input waveguide by means of dielectric supports.

5. The apparatus defined n claim 1 wherein: said input waveguide has a square cross-section and includes a polarization converter waveguide section with a diagonally disposed dielectric plate; and said conductor is fastened to said dielectric plate.

6. The apparatus as defined in claim 4 wherein said input waveguide has a square cross section and said dielectric support includes four arms each extending diagonally from said conductor to a respective corner of said square waveguide.

7. A waveguide network and coupling arrangement for a microwave antenna associated with four communication signal paths corresponding respectively to two polarizations in each of two different frequency bands, and providing a higher order mode signal useable for monopulse tracking of the antenna, said network and coupling arrangement comprising in combination:

a microwave antenna feed horn;

an input waveguide in which the primary mode signals of both frequency bands and both polarizations are able to progagate and which has one end connected to said antenna feed horn;

a four-port waveguide network means, including a further waveguide section having one end connected to the other end of said input waveguide, for separating said two frequency bands, said four-port network means including a first means, including first and second oppositely disposed waveguide arms opening into said further waveguide section, for coupling out one polarization of one of said frequency bands, and a second waveguide means, including third and fourth oppositely disposed waveguide arms opening into said further waveguide section, for coupling out the other polarization of said one frequency band; a first hybrid means, connected to said first and second waveguide arms, for providing an output signal corresponding to the communication signal for said one polarization of said one frequency band; and a second hybrid means, connected to said third and fourth waveguide arms, for providing an output signal corresponding to the communication signal for said other polarization of said one frequency band; and, means for coupling at least one higher order mode of said communication signals of said one frequency band, which higher order mode is able to be excited in said antenna feed horn and to exist in the throat of said antenna feed horn but is not able to propagate through said input waveguide due to its dimensions, to said waveguide arms, said means for coupling including a conductor disposed along the longitudinal axis of said input waveguide and extending from the region of said throat of said feed horn to the vicinity of said openings of said arms in said further waveguide section, whereby signals of said higher order mode are conducted along said conductor, are coupled together with the communication signals of said one frequency band to said arms, are separated from said communication signals of said one frequency band in the respective said hybrid means and appear at a second output of the respective said hybrid means.

8. The apparatus defined in claim 7 wherein each said hybrid means is a 180° hybrid and said communication signals appear at the sum output of the respective said 180° hybrid and said signals of said higher modes appear at the difference output of the respective said 180° hybrid.

* * * * *